(12) United States Patent
Classen et al.

(10) Patent No.: US 8,561,465 B2
(45) Date of Patent: Oct. 22, 2013

(54) ROTATION RATE SENSOR

(75) Inventors: Johannes Classen, Reutlingen (DE);
Torsten Ohms, Vaihingen/Enz-Aurich (DE); Daniel Christoph Meisel, Vaihingen An der Enz (DE); Joerg Hauer, Reutlingen (DE)

(73) Assignee: Robert Bosch GmbH, Stuttgart (DE)

( * ) Notice: Subject to any disclaimer, the term of this patent is extended or adjusted under 35 U.S.C. 154(b) by 1051 days.

(21) Appl. No.: 12/587,487

(22) Filed: Oct. 6, 2009

(65) Prior Publication Data
US 2010/0122576 A1 May 20, 2010

(30) Foreign Application Priority Data
Nov. 17, 2008 (DE) .......................... 10 2008 043 796

(51) Int. Cl.
*G01C 19/00* (2013.01)
(52) U.S. Cl.
USPC ...................................................... 73/504.12
(58) Field of Classification Search
USPC ................. 73/504.12, 503.3, 504.02, 514.02, 73/514.32
See application file for complete search history.

(56) References Cited

U.S. PATENT DOCUMENTS

| | | | | |
|---|---|---|---|---|
| 4,590,801 A | * | 5/1986 | Merhav ............................ | 73/510 |
| 5,723,790 A | * | 3/1998 | Andersson ................. | 73/514.36 |
| 5,959,209 A | * | 9/1999 | Takeuchi et al. ........... | 73/514.34 |
| 6,122,965 A | * | 9/2000 | Seidel et al. ................ | 73/514.36 |
| 6,131,457 A | * | 10/2000 | Sato ............................ | 73/514.31 |
| 6,349,597 B1 | * | 2/2002 | Folkmer et al. ............. | 73/504.02 |
| 6,829,937 B2 | * | 12/2004 | Mahon ........................ | 73/514.29 |
| 6,862,795 B2 | * | 3/2005 | Mahon ............................ | 29/595 |
| 6,973,844 B2 | * | 12/2005 | Sakai ........................ | 73/862.041 |
| 7,040,922 B2 | * | 5/2006 | Harney et al. .................. | 439/527 |
| 7,243,545 B2 | * | 7/2007 | Sakai et al. ................. | 73/514.32 |
| 7,284,429 B2 | * | 10/2007 | Chaumet et al. ........... | 73/504.12 |
| 7,316,965 B2 | * | 1/2008 | Hooper et al. ................ | 438/460 |
| 2003/0154788 A1 | * | 8/2003 | Willig et al. ............... | 73/504.02 |
| 2004/0211257 A1 | * | 10/2004 | Geen .......................... | 73/504.04 |
| 2005/0081633 A1 | | 4/2005 | Nasiri et al. | |
| 2005/0082252 A1 | | 4/2005 | Nasiri et al. | |
| 2006/0119216 A1 | * | 6/2006 | Kouma et al. .................. | 310/309 |
| 2006/0156814 A1 | * | 7/2006 | Blomqvist ................. | 73/504.12 |
| 2006/0219006 A1 | | 10/2006 | Nasiri et al. | |
| 2008/0092652 A1 | * | 4/2008 | Acar .......................... | 73/504.02 |
| 2008/0276706 A1 | * | 11/2008 | Hartmann et al. ......... | 73/504.04 |

\* cited by examiner

*Primary Examiner* — Peter MacChiarolo
*Assistant Examiner* — Samir M Shah
(74) *Attorney, Agent, or Firm* — Kenyon & Kenyon LLP (57) ABSTRACT

A rotation rate sensor includes: a mounting device; a first drive frame having a drive, which is designed to set the first drive frame into a first oscillatory motion along an axis of oscillation relative to the mounting device; a first stator electrode; a first actuator electrode coupled to the first drive frame in such a way that in a rotary motion of the rotation rate sensor due to a Coriolis force, the first actuator electrode being displaceable in a first deflection direction relative to the first stator electrode; and an evaluation device configured to determine a voltage applied between the first stator electrode and the first actuator electrode, and to specify information regarding the rotary motion of the rotation rate sensor while taking the determined voltage value into account.

10 Claims, 10 Drawing Sheets

ROTATION RATE SENSOR

BACKGROUND OF THE INVENTION

1. Field of the Invention

The present invention relates to a rotation rate sensor.

2. Description of Related Art

A conventional micromechanical rotation rate sensor usually includes a mass situated in a mounting support so as to be displaceable, which mass is able to be driven into an oscillatory motion with respect to the mounting support. If a rotary body on which the micromechanical rotation rate sensor is affixed executes a rotary motion which is not parallel to the oscillatory motion, a Coriolis force is imparted to the mass driven into the oscillatory motion, by which the displaceable mass is additionally deflected. Via a sensor device, which includes a capacitor, for example, this additional deflection of the displaced mass can be detected and evaluated with regard to a variable describing the rotary motion of the rotatable body, for instance. Such a variable is a rate of rotation of the rotary motion of the rotatable body, for instance.

Published U.S. patent applications U.S. 2005/0081633 A1, U.S. 2006/0219006 A1, and U.S. 2005/0082252 A1 describe rotation rate sensors whose displaceable masses can be driven into an oscillatory motion about a first axis of rotation. In this case a Coriolis force can impart an additional rotary motion to the oscillating mass in a plane of oscillation about a second axis of rotation that is aligned perpendicular to the first axis of rotation, and thereby cause shifting/tilting of the displaced mass out of the plane of oscillation.

However, the rotation rate sensors of published U.S. patent applications US 2005/0081633 A1, US 2006/0219006 A1 and US 2005/0082252 A1 have the disadvantage that only a portion of the mass driven into an oscillatory motion about the first axis of rotation is deflected by the Coriolis force about the second axis of rotation. In these types of rotation rate sensors, the Coriolis force therefore induces a relatively weak signal whose evaluation with regard to information representing the rotary motion of the rotatable body is relatively imprecise and often contains errors. In addition, the detection and the evaluation of the shifting/tilting of the oscillating mass out of its plane of oscillation due to the Coriolis force is relatively complex.

BRIEF SUMMARY OF THE INVENTION

The present invention is based on the realization that driving the drive frame into a linearly aligned oscillatory motion along the axis of oscillation results in the advantage that in a rotary motion of the rotation rate sensor, a Coriolis force causes a linear deflection in at least one first deflection direction. The axis of oscillation and the deflection direction are straight lines. As a result, the present invention dispenses with the detection and the evaluation of a tilting movement of a mass driven into oscillations about an axis of rotation, which requires more work and leads to less precise results.

In contrast to the related art, the rotation rate sensor according to the present invention has the additional advantage that the entire mass driven into oscillatory motion is deflectable by the Coriolis force. This allows for a large Coriolis signal.

In one advantageous development, the axis of oscillation is aligned at an angle of inclination between 85° to 90° relative to the interior surface surrounded by the first drive frame. This development thus provides the advantage that the linear oscillatory motion of the drive frame perpendicular to the interior surface results in an out-of-phase driving of the drive frame out of a chip plane. In this way the displacement motion of the drive frame in the chip plane imparted by the Coriolis force is able to be detected. This could be called an in-plane detection.

For example, the axis of oscillation is aligned perpendicular to the framed interior surface. Since the amplitude of the displacement movement imparted by the Coriolis force is usually smaller than the amplitude of the oscillatory motion, the extension of the rotation rate sensor parallel to the drive frame is able to be reduced. This allows for a minimization of the rotation rate sensor and thus for an uncomplicated placement of the rotation rate sensor on a rotatable body.

The out-of-phase oscillatory motion is especially advantageous in cases where the gap clearances in the chip plane are insufficient to ensure a sufficiently high drive amplitude (amplitude of the oscillatory motion) for the rotation rate sensor. In these cases the out-of-plane drive may be utilized to reduce the required space in the chip plane. In this case, only small gaps are required in the chip plane, which correspond to the amplitudes of the displacement movements caused by the Coriolis force. The amplitudes of the displacement movement caused by the Coriolis force are typically smaller than the drive amplitudes by an order of magnitude.

In one further advantageous example embodiment, the drive includes at least one drive electrode mounted on the first drive frame, at least one counter electrode fixedly disposed relative to the mounting support, and a control device, which is designed to apply a drive voltage between the at least one drive electrode and the at least one counter electrode. The description that an electrode is fixed in place on a component means that the electrode is linked to the component in such a way that it cannot be induced to move relative to the component to any significant degree. The cost-effective drive described here makes it possible to set the drive frame in oscillatory motion in an uncomplicated manner. It is pointed out here, however, that the present invention is not restricted to an electrostatic drive. As an alternative to the electrostatic drive, a magnetic drive or a piezoelectric drive, for example, may also be used for driving the drive frame into the desired oscillatory motion with respect to the mounting support.

Preferably, at least the first actuator electrode is mounted on a detection frame, which is connected to the first drive frame by an intermediate spring. The at least one intermediate spring may have a first spring constant in the oscillation direction, and a second spring constant in the first deflection direction, the second spring constant being greater than the first spring constant. In this way the detection frame is able to be at least partially decoupled from the oscillatory motion of the drive frame. At the same time it is ensured that the detection frame is likewise deflected in the first deflection direction in response to a deflection of the drive frame brought about by the Coriolis force.

In addition, the detection frame may be connected to the mounting support via at least one internal spring. The internal spring may have a first spring constant in the oscillation direction, and a second spring constant in the first deflection direction, the second spring constant being smaller than the first spring constant. This, too, ensures an advantageous decoupling of the detection frame from the oscillatory motion of the drive frame.

In one advantageous further development, the first drive frame is framed by an external drive frame, the external drive frame being joined to the first drive frame via at least one additional intermediate spring, and the drive additionally being designed to drive the external drive frame into a first oscillatory motion along the axis of oscillation. Preferably, the external drive frame is thus excited to in-phase oscillations with the first drive frame. Furthermore, the external drive frame may be coupled to the mounting device in such a way that it is not displaceable relative to the mounting device in a direction that is not parallel to the axis of oscillation. The Coriolis force acting on the external drive frame is therefore transmitted to the detection frame. This improves the signal-background ratio of the rotation rate sensor.

Preferably, the rotation rate sensor includes a plurality of actuator electrodes, which are at least partially situated parallel to the first actuator electrode along a first longitudinal axis and form a first electrode grid. Placing the actuator electrodes in the form of a first electrode grid and mounting the stator electrodes on the mounting support ensures a large detection area for detecting the movement of the actuator electrodes relative to the stator electrodes.

The first longitudinal axis, in particular, may be aligned perpendicular to the first deflection direction. This ensures that a displacement of the actuator electrodes relative to the stator electrodes along the first deflection direction causes a significant change in the voltage applied between the actuator electrodes and the stator electrodes.

In a further development, the rotation rate sensor includes at least one second stator electrode and at least one second actuator electrode, and the at least one second actuator electrode is coupled to the first drive frame in such a way that in a further rotary motion of the rotation rate sensor due to an additional Coriolis force, the at least one second actuator electrode is displaceable relative to the at least one second stator electrode in a second deflection direction that is not equal to the first deflection direction. An increasing number of applications for rotation rate sensors requires dual-axis rotation rate sensors.

For these purposes the possibility of placing a plurality of single-channel rotation rate sensors next to each other is known from the related art. However, the use of a plurality of separate, single-channel rotation rate sensors has considerable disadvantages with regard to cost, required space, current consumption and the relative orientation precision of the sensitive axes. These disadvantages are able to be avoided by the further development described here.

With the aid of the further development, two orthogonal rates of rotation in the chip plane are able to be detected and evaluated, for instance for the purpose of stabilizing a camera.

For example, the rotation rate sensor may include a plurality of actuator electrodes, which are at least partially situated parallel to the second actuator electrode along a second longitudinal axis and form a second electrode grid. This, too, ensures a large detection area for detecting the movement of the actuator electrodes relative to the stator electrodes. The further development described here thus has two sensitive axes, and two electrode grids, in particular, are placed relative to each other in such a way that each electrode grid is optimized in its alignment for one sensitive axis.

In one further advantageous development, the rotation rate sensor includes a second drive frame, which with the aid of the drive is able to be driven into a second oscillatory motion that is opposite in phase to the first oscillatory motion, along the axis of oscillation, at least one third stator electrode and at least one third actuator electrode, which is coupled to the second drive frame in such a way that in a the rotary motion of the rotation rate sensor due to the Coriolis force, the at least one third actuator electrode is displaceable in the first deflection direction relative to the at least one third stator electrode. This ensures that a linear acceleration of the rotation rate sensor in the first deflection direction will not result in a falsification or an inaccuracy of the determined information regarding the rotary motion of the rotation rate sensor.

The present invention includes single-channel and multi-channel rotation rate sensors, which are able to be produced inexpensively by surface-micromechanics (bulk micromechanics).

A rotation rate sensor according to the present invention is able to be used in a motor vehicle, for instance, for the ESP, the navigation or for rollover sensing. The rotation rate sensor may also be used in the consumer field for image stabilization, motion detection and/or navigation purposes.

DETAILED DESCRIPTION OF THE INVENTION

Figure 1:
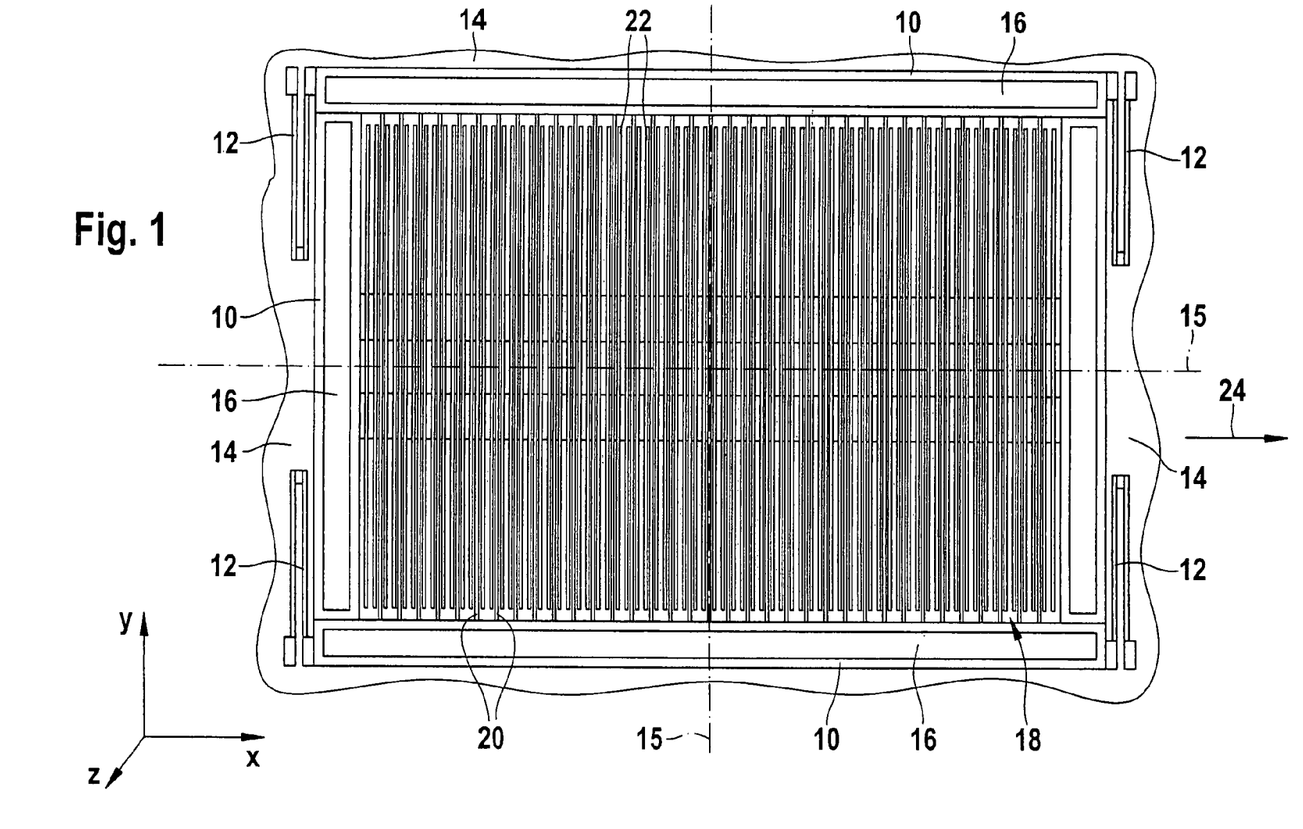
FIG. 1 shows a plan view of a drive frame illustrating a first example embodiment of the rotation rate sensor.

FIG. 1 shows a plan view of a drive frame in order to illustrate a first example embodiment of the rotation rate sensor.

The schematically depicted rotation rate sensor includes a drive frame 10, which is connected to a base plate 14 of a mounting device with the aid of at least one external spring 12. Base plate 14 is part of a housing of the rotation rate sensor, for instance. In the example of FIG. 1, the rotation rate sensor has four external springs 12. It is advantageous in this context if external springs 12 are disposed on drive frame 10 in such a way that drive frame 10 with external springs 12 is in mirror symmetry with regard to two center axes 15 extending through the plane of drive frame 10. However, it is pointed out that the example embodiment described here is not restricted to a specific number and/or specific placement of external springs 12 on drive frame 10.

At least one drive electrode 16 is fixed in place on a surface of drive frame 10 that is aligned parallel to an inner surface framed by drive frame 10. It is preferred if the surface is covered to a high percentage or in full by at least one drive electrode 16. In one especially advantageous example embodiment, both surfaces of drive frame 10, which run parallel to the inner surface framed by drive frame 10, are at least partially covered by drive electrodes 16.

Affixed adjacent to the at least one drive electrode 16 of drive frame 10 is at least one (not sketched) counter electrode on the holding device, for example on base plate 14. The at least one counter electrode is situated such that a movement of drive frame 10 relative to the mounting device does not adversely affect its position with respect to the mounting device.

Using a control device (not illustrated), a drive voltage is able to be applied between the at least one drive electrode 16 and the at least one counter electrode. This makes it possible to set drive frame 10 into a linear oscillatory motion relative to the mounting device along an axis of oscillation. In the illustrated example of FIG. 1, the inner surface framed by unmoved drive frame 10 lies in the xy plane, and the axis of oscillation is aligned parallel to the z-axis.

The at least one external spring 12 preferably has a relatively low flexural rigidity in the direction of the axis of oscillation (z-direction). Therefore, the at least one external spring 12 permits reliable maintaining of the linear oscillatory motion along the axis of oscillation with a relatively large amplitude. Additional advantageous characteristics of the at least one external spring 12 will be discussed in the following text. Furthermore, because of the mirror-symmetrical design of drive frame 10 and external springs 12 mounted thereon, it is ensured that the linearity of the oscillatory motion of drive train 10 is maintained reliably.

Mounted within the inner surface framed by drive frame 10 is an electrode grid 18 of actuator electrodes 20 situated parallel to one another. In the illustrated development, actuator electrodes 20 are affixed directly on the inner surfaces of drive frame 10. Actuator electrodes 20 have a common longitudinal axis, which is aligned perpendicular to the axis of oscillation and parallel to the y-axis. The rotation rate sensor described here is not restricted to a specific number of actuator electrodes 20.

Situated on the mounting device in a fixed manner next to each actuator electrode 20 is at least one stator electrode 22. For instance, stator electrodes 22 are affixed on base plate 14 in such a way that a movement of drive frame 10 and actuator electrodes 20 relative to base plate 14 does not adversely affect their position with respect to base plate 14.

Each actuator electrode 20 preferably has on each of the two side surfaces an associated stator electrode 22. Together with their cooperating stator electrodes 22, each actuator electrode 20 thus forms two capacitors made up of actuator electrode 20 and one stator electrode 22.

The rotation rate sensor of FIG. 1 may be fixed in place on a rotatable body. If the rotatable body together with drive frame 10 set into the linear oscillatory motion executes a rotary motion about an axis of rotation aligned perpendicular to the axis of oscillation, then a Coriolis force that is aligned perpendicular to the axis of rotation of the rotatable body and the axis of oscillation is acting on drive frame 10.

The at least one external spring 12 is designed in such a way that a displacement movement of drive frame 10 and actuator electrodes 20 is possible along a deflection direction 24 relative to the mounting device due to an x-component of the Coriolis force. Deflection direction 24 is aligned parallel to the x-axis in the illustrated example. As a result, the example embodiment described here is best suited for determining information regarding a rotary motion of the rotatable body having an axis of rotation extending parallel to the y-axis.

Preferably, the flexural rigidity of the at least one external spring 12 is significantly greater in the y-direction than along deflection direction 24. The at least one external spring 12 is a U-spring and/or a torsion spring, for instance. The at least one external spring 12 designed as U-spring is thus able to be mounted on base plate 14 via a first end and on drive frame 10 via a second end, such that affixed external spring 12 extends perpendicular to the axis of oscillation and perpendicular to deflection direction 24. It is pointed out here, however, that the present invention is not restricted to a specific form or placement of the at least one external spring 12.

The displacement movement of actuator electrodes 20 along deflection direction 24 causes an increase or decrease in the clearance between two electrodes 20 and 22 interconnected into a capacitor, and thus a change in the voltage (or a capacitance of the capacitor) applied between electrodes 20 and 22. Since the increase or decrease in the clearance between two electrodes 20 and 22 and the change in the applied voltage is proportional to the Coriolis force in the first approximation, an evaluation of the voltage change with the aid of an evaluation device (not illustrated) makes it possible to determine information that describes the rotary motion of the rotating body in a reliable manner. A variable that is proportional to the Coriolis force, for instance, is the rate of rotation or the rotational speed of the rotating body.

Thus, not only is it possible to detect the rotary motion of the rotatable body about an axis of rotation lying perpendicular to the axis of oscillation (in the xy plane) by the determined voltage change, but a component of the rate of rotation (y-component) lying perpendicular to the axis of oscillation and deflection direction 24 is able to be specified in addition. In particular, the rotation rate sensor of FIG. 1 is especially suitable for detecting a rotary motion of the rotatable body about the y-axis and/or for determining the associated rate of rotation or the associated rotational speed.

FIG. 1 represents a basic structure for a single-channel, out-of-plane-driven rotation rate sensor whose in-plane displacement (along deflection direction 24) caused by Coriolis forces is able to be read out in capacitive manner for the purpose of determining information regarding a rotary motion of the rotatable body. When evaluating the voltage changes, it is advantageous to additionally consider that the linear oscillatory motion of drive frame 10 also causes changes in the voltages applied between electrodes 20 and 22. The changes in the voltages applied between electrodes 20 and 22, which are caused by the linear oscillatory motion of drive frame 10, are frequently referred to as quadrature.

The out-of-plane-driven rotation rate sensor has the advantage that the oscillatory motion of drive frame 10 does not lie in the plane of the inner surface framed by drive frame 10. Only the deflection movement along deflection direction 24 caused by the Coriolis force lies in the plane of drive frame 10. Thus, it is not necessary to enlarge the basic surface of the rotation rate sensor parallel to the plane of drive frame 10 due to the relative large amplitudes of the oscillatory movement relative to the deflection movement. This ensures a reduced size of the rotation rate sensor.

In addition, electrode grid 18 ensures a relatively large contact surface between electrodes 20 and 22 for a capacitive read-out of the deflection of the oscillating mass caused by the Coriolis force. In particular, the ratio between the contact surface and the oscillating mass is advantageously large. In the same way it is advantageous that the entire mass set into oscillatory motion is deflected by the Coriolis force and thus supplies a relatively large Coriolis signal. This improves the measuring precision when determining a value regarding the voltage applied between electrodes 20 and 22.

Components 10 through 22 of the rotation rate sensor described in the above paragraphs can also be etched out of a material layer applied on a substrate. The production of the rotation rate sensor is thus relatively simple and cost-effective even for a relatively small size of components 10 through 22, and the mutual adjustment of components 10 through 22 is dispensed with.

Advantageous further developments of the basic structure are described in the further text.

Figure 2:
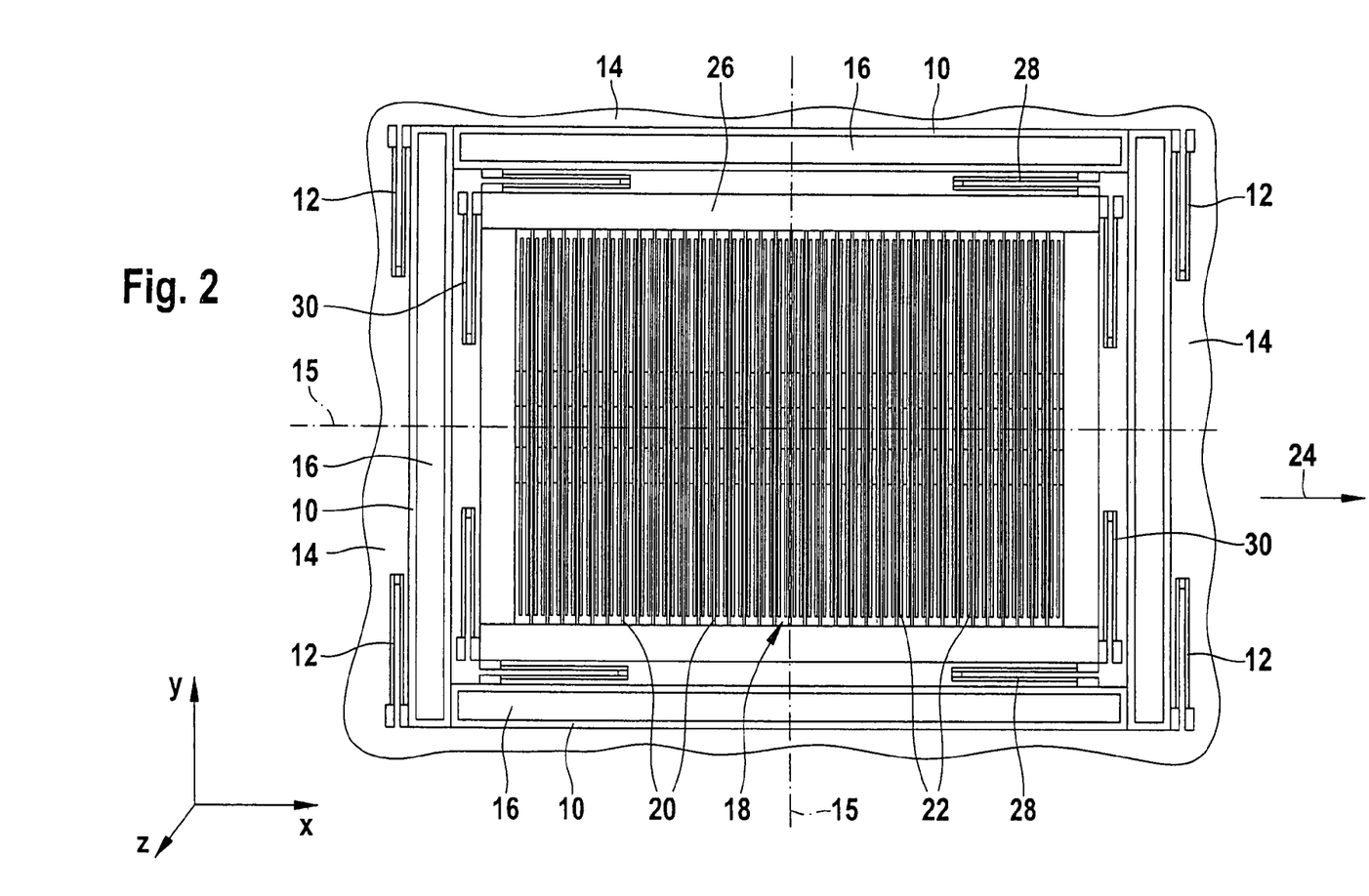
FIG. 2 shows a plan view of a drive frame illustrating a second example embodiment of the rotation rate sensor.

FIG. 2 shows a plan view of an additional drive frame in order to illustrate a second example embodiment of the rotation rate sensor.

The schematically illustrated rotation rate sensor includes the already described components 10 through 22. Drive frame 10 is thus able to be set into a linear oscillatory motion along the z-axis in this development as well. In the same way, electrode grid 18 of the rotation rate sensor from FIG. 2 is deflectable in deflection direction 24 aligned parallel to the x-axis.

In contrast to the previous embodiment, however, actuator electrodes 20 are not mounted directly on drive frame 10. Instead, electrode grid 18 made up of actuator electrodes 20 is clamped into a detection frame 26, which is situated within the inner surface framed by drive frame 10.

Preferably, only the surfaces of drive frame 10 are covered by at least one drive electrode 16, while detection frame 26 has no drive electrode 16. Detection frame 26 is thus not directly excited to an oscillatory motion. The advantages of this procedure will be discussed in greater detail in the following text.

Detection frame 26 is connected to drive frame 10 via at least one intermediate spring 28. The at least one intermediate spring 28 preferably has a high spring constant in the x-direction and a significantly lower spring constant in the z-direction. The at least one intermediate spring 28 may be a U-spring, for example, whose alignment lies parallel to the x-axis. Of course, the at least one intermediate spring 28 may also be a torsion spring.

In one advantageous embodiment, the placement of a plurality of intermediate springs 28 is such that drive frame 10 and detection frame 26, which is connected to drive frame 10 by means of intermediate springs 28, are in mirror symmetry with respect to two center axes 15 extending through frames 10 and 26. However, the embodiment described here is not restricted to a specific number or placement of intermediate springs 28.

Furthermore, detection frame 26 may be coupled to the mounting device, e.g., to base plate 14, via at least one internal spring 30. The at least one internal spring 30 preferably has a high spring constant in the y-direction and in the z-direction and a significantly lower spring constant in the x-direction. For example, the at least one internal spring 30 is a U-spring or a torsion spring. The placement of a plurality of internal springs 30 between the mounting device and detection frame 26 may be implemented in such a way that internal springs 30 are aligned in Mirror symmetry with regard to center axes 15 extending through the surfaces of frames 10 and 26.

Forming a detection frame 26 that is separated from drive frame 10 and using additional springs 28 and 30 makes it possible to decouple the detection movement along deflection direction 24 from the linear oscillatory motion. This ensures that, compared to drive frame 10, electrode grid 18 made up of actuator electrodes 20 oscillates at least at a smaller amplitude along the z-axis. The decoupling of the detection movement from the linear oscillatory motion causes at least a reduction of the voltage change, induced by the linear oscillatory motion, between electrodes 20 and 22. This at least minimizes the quadrature. It is preferred if the detection movement is decoupled from the linear oscillatory motion in such a way that the linear oscillatory motion of drive frame 10 does not cause any change in the voltage applied between electrodes 20 and 22.

At the same time, because of the oscillatory motion of drive frame 10 along the z-axis, it is ensured that a sufficiently high Coriolis force is acting on drive frame 10 and is transmittable to detection frame 26 via intermediate springs 28. The deflection movement of electrode grid 18 along deflection direction 24, which supplies a measuring signal that may be referred to as Coriolis signal, is thus possible without interruption. In this context it is advantageous that in the example embodiment described here the Coriolis signal is superposed or interfered with by the quadrature to a lesser degree or not at all. That is to say, the phenomenon, which is usually referred to as loading the capacitance signal by a quadrature, consequently occurs in a less pronounced manner. The evaluation of the Coriolis signal therefore calls for less computing work since the filtering out of the quadrature is often dispensed with or requires less work.

Figure 3:
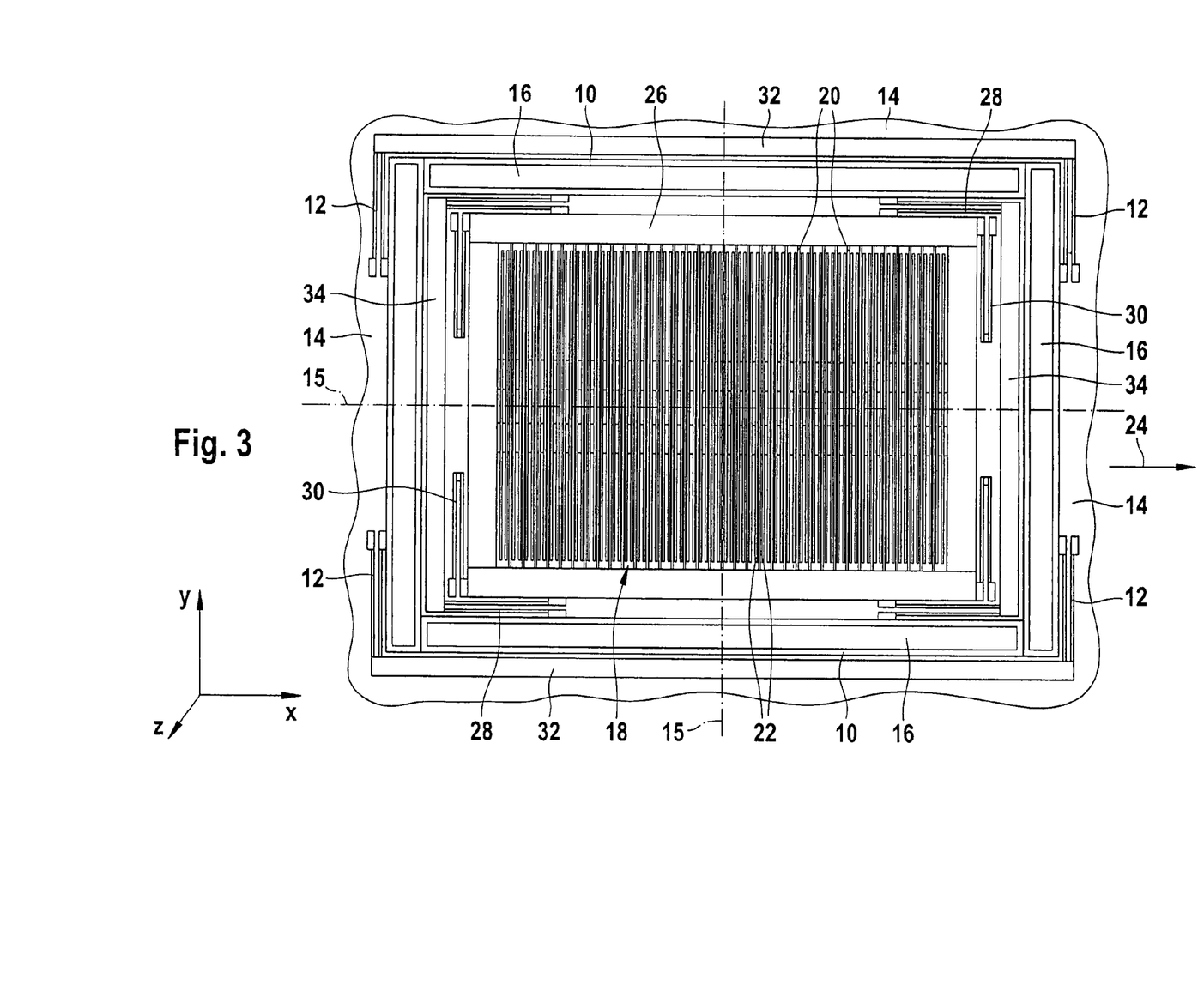
FIG. 3 shows a plan view of a drive frame illustrating a third example embodiment of the rotation rate sensor.

FIG. 3 shows a plan view of an additional drive frame to illustrate a third example embodiment of the rotation rate sensor.

The rotation rate sensor schematically represented in FIG. 3 includes components 10 through 22 and 26 through 30 of the previously described embodiment. Furthermore, the rotation rate sensor described here has additional web elements 32 and 34, the two external web elements 32 connecting two external springs 12, and the two internal web elements 34 connecting two intermediate springs 28 to each other. While external web elements 32 extend parallel to the x-axis, internal web elements 34 are aligned parallel to the y-axis. External web elements 32 are preferably designed in one piece together with associated external springs 12, and internal web elements 34 are designed in one piece with associated intermediate springs 28.

Additional web elements 32 and 34 counteract any undesired rotation of frames 10 and 26 about the x-axis or about the y-axis. Web elements 32 and 34 thus additionally stabilize the linear oscillatory motion of drive frame 10 along the z-axis.

Figure 4:
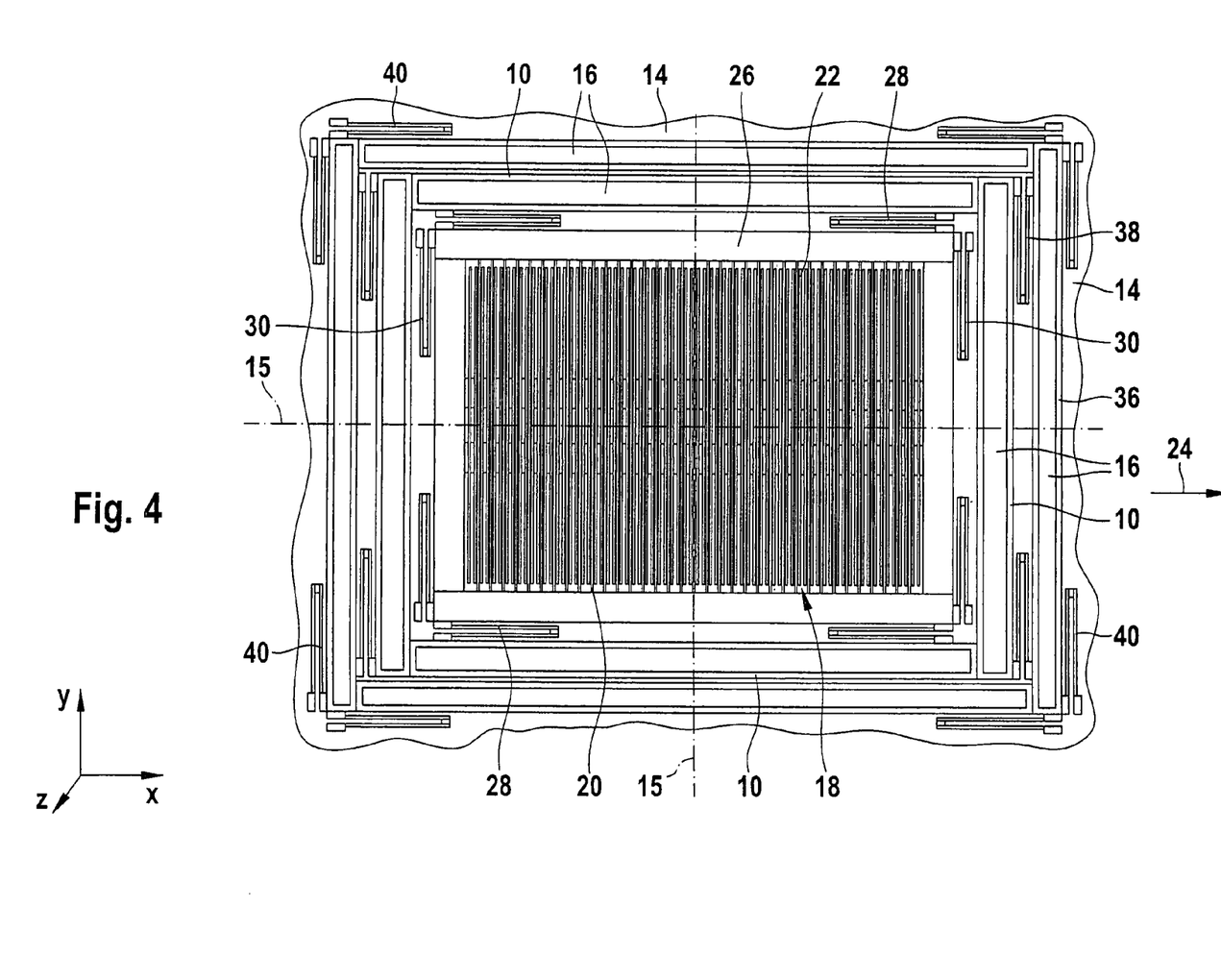
FIG. 4 shows a plan view of a drive frame illustrating a fourth example embodiment of the rotation rate sensor.

FIG. 4 shows a plan view of a drive frame to illustrate a fourth example embodiment of the rotation rate sensor.

In contrast to the embodiment from FIG. 2, the embodiment from FIG. 4 has an outer drive frame 36 in addition to components 10 through 22 and 26 through 30. Outer drive frame 36 frames (inner) drive frame 10, the two drive frames 10 and 36 being situated parallel to each other. Similar to the previous example from FIG. 2, detection frame 26 is situated within the inner surface of inner drive frame 10 and connected thereto via the at least one intermediate spring 28.

Analogously to inner drive frame 10, outer drive frame 36 likewise includes at least one drive electrode 16, which sets outer drive frame 36 into an oscillatory motion along the z-axis via an interaction with an adjacent counter electrode (not illustrated) which is fixedly positioned with respect to the mounting device.

In particular, the oscillatory motion of outer drive frame 36 may be co-phasal with the oscillatory movement of inner drive frame 10.

In the example embodiment shown, inner drive frame 10 has no (external) spring via which it is directly connected to base plate 14 of the mounting device. Instead, inner drive frame 10 is connected to outer drive frame 36 by means of at least one additional intermediate spring 38. The at least one additional intermediate spring 38 preferably has a considerably higher spring constant in the y-direction than in the x-direction or in the z-direction. The advantages of such an additional intermediate spring 38 will be discussed in greater detail in the following text.

Outer drive frame 36 is joined to base plate 14 by a plurality of mounting springs 40, in such a way that a deflection of outer drive frame 36 relative to base plate 14 in the x-direction and the y-direction is possible only when using relatively high force, which could lead to damage of the rotation rate sensor.

A Coriolis force acting on outer drive frame 36 thus will not result in a displacement of outer drive frame 36 relative to base plate 14, even if outer drive frame 36 is set into an oscillatory motion along the z-axis. A displacement movement of inner drive frame 10 along deflection direction 24 caused by the Coriolis force is consequently able to be transferred to detection frame 26 in a satisfactory manner.

At the same time, detection frame 26 is able to be at least partially decoupled from the oscillatory motions of the two drive frames 10 and 36 in the manner already described above. This makes it possible to evaluate the voltages applied between electrodes 20 and 22 in a simple manner in order to determine at least one item of information with regard to a rotary motion of a rotatable body using the rotation rate sensor described here.

Furthermore, springs 12, 28, 38 and 40 may be designed in such a way that they have a relatively low spring constant in the z-direction. In contrast, it is advantageous to provide inner springs 30 with a relatively high spring constant in the z-direction.

Additional possibilities for reducing or suppressing the influence of the quadrature on the measuring signal tapped at electrodes 20 and 22 are described here briefly:

For example, stator electrodes 22 may be positioned on the mounting device in such a way that they are in mirror symmetry with respect to a central plane extending through unmoved drive frame 10 and intersecting all actuator electrodes 20. In this case the effect of the quadrature in a movement of actuator electrodes 20 along the axis of oscillation is negligible.

In the same way, the rotation rate sensor may be designed for a rotating oscillatory motion of detection frame 26. In this case, driven actuator electrodes 20 rotate relative to stator electrodes 22. The effect of the quadrature is negligible in this modification as well.

Furthermore, stator electrodes 22 may be situated on the mounting device in such a manner that they move along the z-axis together with oscillating actuator electrodes 20. In this case the oscillatory motion of actuator electrodes 20 has no effect on the voltages applied between electrodes 20 and 22. In addition, stator electrodes 22 may be situated on the mounting devices in such a way that only a relatively high force, which leads to damage of the rotation rate sensor, is able to move them in deflection direction 24.

As an alternative, stator electrodes 22 may have a height in the z-direction that is considerably greater than the height of actuator electrodes 20. For example, the height of stator electrode 22 amounts to at least twice the amplitude of the oscillatory motion of actuator electrodes 20. In this case the oscillatory motion of actuator electrodes 20 does not result in a change in capacitance.

One skilled in the art will not find it difficult to execute the alternative example embodiments described above with the aid of the descriptions. For that reason, the alternative embodiments will not be described here in greater detail.

Figure 5:
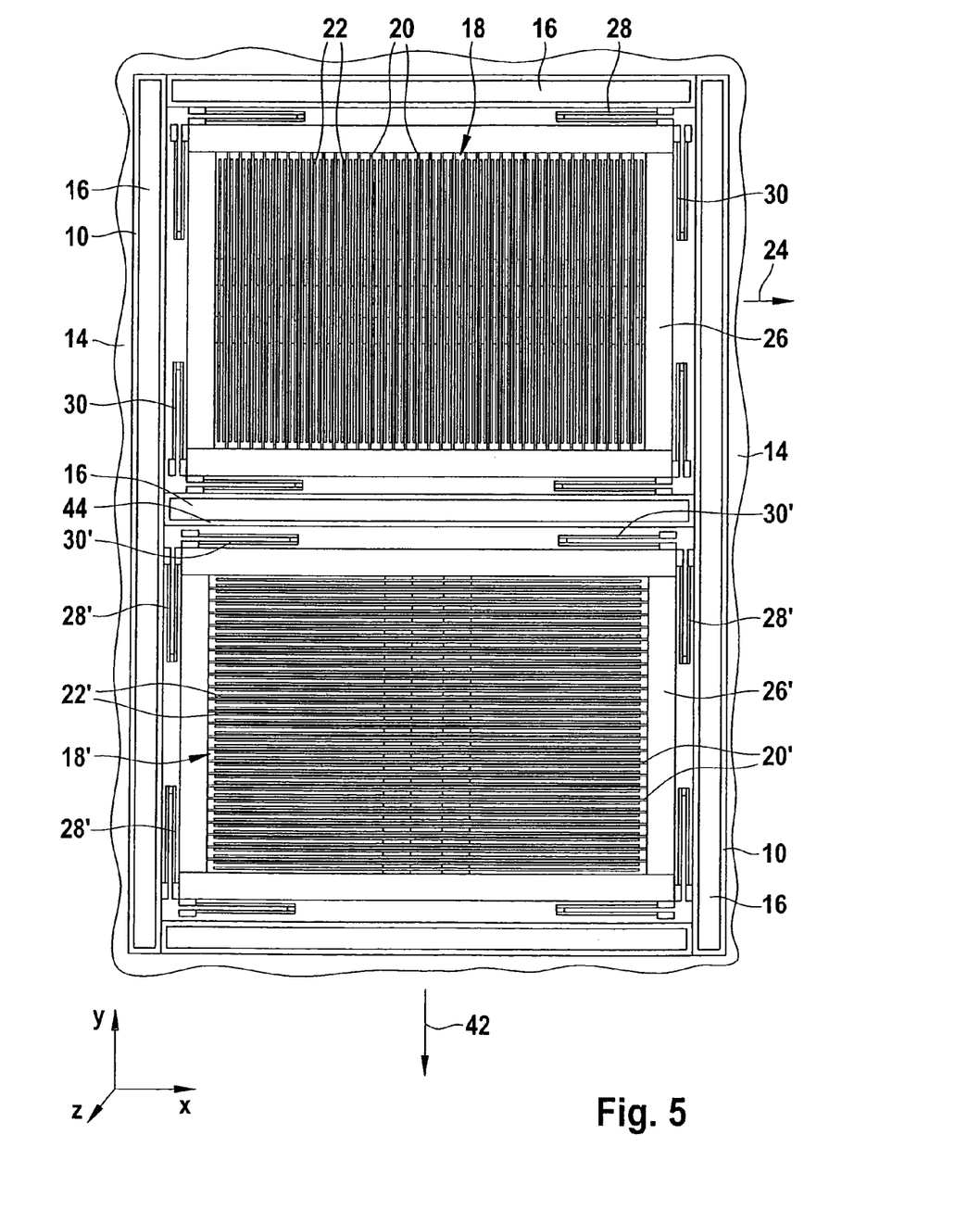
FIG. 5 shows a plan view of a drive frame illustrating a fifth example embodiment of the rotation rate sensor.

FIG. 5 shows a plan view of an additional drive frame to illustrate a fifth example embodiment of the rotation rate sensor.

The further development of the rotation rate sensor from FIG. 2 illustrated here has two electrode grids 18 and 18' made up of actuator electrodes 20 and 20'. Each of the two electrode grids 18 and 18' is mounted on its own detection frame 26 and 26'.

A partition 44 subdivides the inner surface framed by drive frame 10 into two partial surfaces that are separated from one another. Each of the two detection frames 26 and 26' is situated in a separate partial surface.

First detection frame 26 with first electrode grid 18 is connected to drive frame 10 via intermediate springs 28, in such a way that actuator electrodes 20 of first electrode grid 18 are aligned parallel to the y-axis. Similarly, associated stator electrodes 22 are likewise fixedly disposed on the mounting device parallel to the y-axis. The placement of intermediate springs 28, via which first detection frame 26 is coupled to drive frame 10, is selected in such a way that a Coriolis force is able to deflect first detection frame 26 relative to drive frame 10 in a first deflection direction 24. First deflection direction 24 runs parallel to the x-axis. In contrast, second detection frame 26' with second electrode grid 18' is coupled to two diametrically opposed inner surfaces of drive frame 10 via intermediate springs 28', such that actuator electrodes 20' of second electrode grid 18' have a shared longitudinal direction parallel to the x-axis. Stator electrodes 22', interacting with second electrode grid 18', are also aligned parallel to the x-axis. In contrast to first electrode grid 18, second electrode grid 18' is coupled to drive frame 10 in such a way that a Coriolis force is able to deflect second electrode grid 18' relative to drive frame 10 in a second deflection direction 42 aligned parallel to the y-axis.

In the example embodiment described here, an angle of 90° lies between first deflection direction 24 and second deflection direction 42. However, it is pointed out that for a rotation rate sensor having two electrode grids 18 and 18', the longitudinal direction of actuator electrodes 20 and 20' may also be selected such that actuator electrodes 20 and 20' of both electrode grids 18 and 18' are situated at an angle of inclination of between 0 and 90° relative to each other.

In addition, each of the two detection frames 26 and 26' is able to be coupled to base plate 14 of the mounting device via at least one internal spring 30 and 30'. Thus, this example embodiment also makes it possible to at least partially decouple detection frames 26 and 26' from the oscillatory motion of drive frame 10 and to minimize the effect of the quadrature on the measuring result.

With the aid of drive electrodes 16 mounted on drive frame 10, and the counter electrodes (not sketched), drive frame 10 in this example embodiment as well is able to be set into an oscillatory motion along the z-axis. If during the oscillatory motion of drive frame 10 the rotatable body having the rotation rate sensor described here is rotated about the y-axis, then a Coriolis force causes a displacement movement of first detection frame 26 along first deflection direction 24. This displacement movement of first detection frame 26 along first deflection direction 24 goes hand in hand with a considerable change in the voltage applied between electrodes 20 and 22. Correspondingly, a rotary motion of the rotatable body about the x-axis results in a significant change in the voltage applied between actuator electrodes 20' of second electrode grid 18' and associated stator electrodes 22'.

Therefore, the example embodiment described here is designed to determine rates-of rotation of the rotatable body about an axis of rotation lying in the xy plane. For this reason, the specific development may be called a dual-channel, out-of-plane-driven rotation rate sensor.

The rotation rate sensor schematically depicted in FIG. 5 has the special advantage that its required installation space is considerably smaller than the sum of two rotation rate sensors according to FIG. 2. Thus, to save costs and to reduce the required space, it suggests itself to use the rotation rate sensor from FIG. 5 in place of two rotation rate sensors from FIG. 2 for determining information regarding a rotary motion of the rotatable body about an axis of rotation lying in the xy plane.

Figure 6:
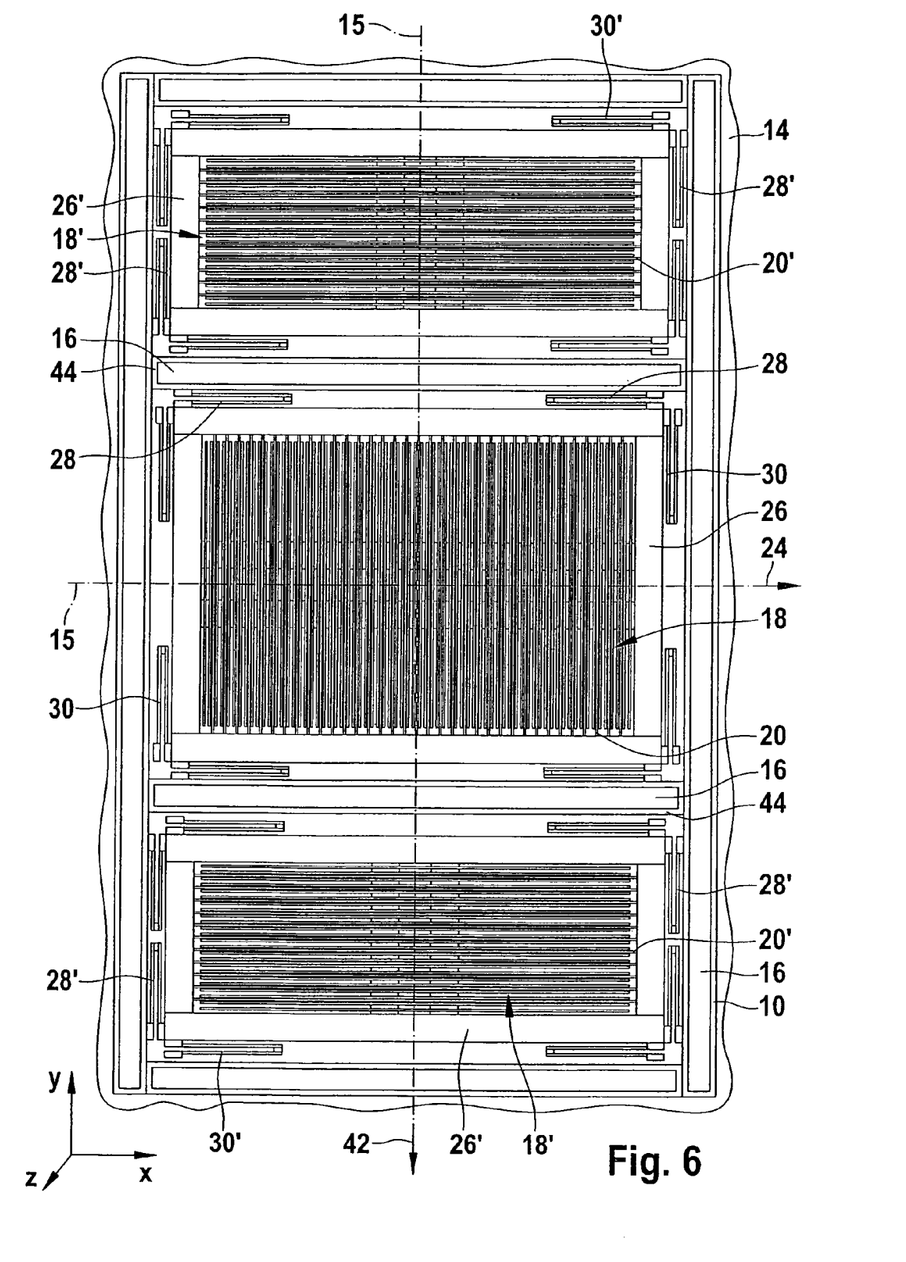
FIG. 6 shows a plan view of a drive frame illustrating a sixth example embodiment of the rotation rate sensor.

FIG. 6 shows a plan view of an additional drive frame to illustrate a sixth example embodiment of the rate-of-rotation sensor.

The inner surface, framed by drive frame 10, of the schematically depicted rotation rate sensor is subdivided into three partial surfaces by two partitions 44. The two partitions 44 aligned parallel to the x-axis are situated in such a way that the center partial surface is significantly larger than the outer partial surfaces.

Situated in each of the two partial surfaces is a detection frame 26 or 26' having an electrode grid 18 or 18' disposed thereon. Center detection frame 26 having center electrode grid 18 is considerably larger than the two outer detection frames 26' having an outer electrode grid 18' in each case. Center detection frame 26 is therefore mounted in the center partial surface of drive frame 10. The two outer detection frames 26' are disposed in a separate outer partial surface in each case.

Preferably, the surface of center electrode grid 18 is also considerably greater than the individual surfaces of the two outer electrode grids 18'. For example, the surface of center electrode grid 18 may be twice that of the individual surfaces of outer electrode grids 18'.

Each detection frame 26 or 26' is joined to drive frame 10 in the manner already described with the aid of at least one intermediate spring 28 or 28'. In addition, each detection frame 26 and 26' is coupled to the mounting device, e.g., to base plate 14, via at least one internal spring 30 or 30'. This at least partially ensures a decoupling of detection frames 26 and 26' from the oscillatory motion of drive frame 10.

In the case of outer electrode grids 18', actuator electrodes 20' are aligned in a common longitudinal direction parallel to the x-axis. In contrast, actuator electrodes 20 of center electrode grid 18 are aligned parallel to the y-axis. Detection frames 26 and 26' are thus placed in such a way that the two outer electrode grids 18' are aligned parallel to each other, each of the two outer electrode grids 18' being aligned perpendicular to center electrode grid 18.

However, it is pointed out that the specific development described here is not restricted to a perpendicular orientation of outer electrode grids 18' with respect to center electrode grid 18. Instead, the two outer electrode grids 18' aligned parallel to each other may also be aligned at a different angle of inclination between 0 and 90° relative to center electrode grid 18.

Detection frames 26 or 26' are coupled to drive frame 10 via associated intermediate springs 28 or 28' in such a way that a Coriolis force is able to displace center detection frame 26 along first deflection direction 24, and the two outer detection frames 26' along second deflection direction 42. Because of the alignment of the three electrode grids 18 and 18' and their ability to be deflected in a deflection direction 24 or 42, the rotation rate sensor described here is suitable for determining an item of movement information, e.g., the rate of rotation, in a rotary motion of the rotatable body with the rotation rate sensor about a random axis lying in the xy plane.

In addition, the rotation rate sensor schematically illustrated here has the advantage over the rotation rate sensor from FIG. 5 that it exhibits mirror symmetry with regard to the two center axes 15 aligned parallel to the x-axis or the y-axis. Because of the even mass distribution, in the oscillatory motion of drive frame 10 along the z-axis it is thus ensured that the desired direction of oscillation parallel to the x-axis is reliably maintained.

Figure 7:
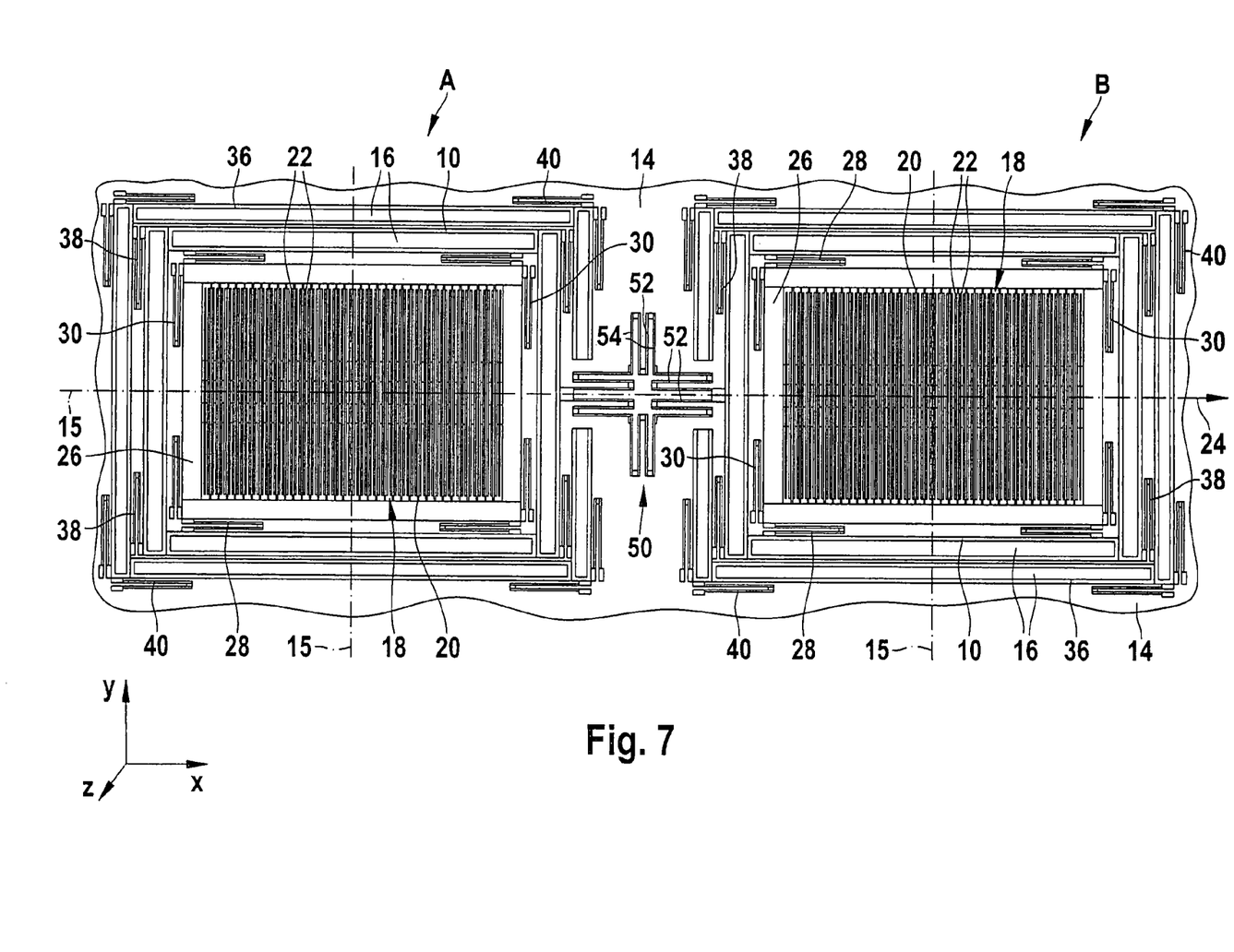
FIG. 7 shows a plan view of a drive frame illustrating a seventh example embodiment of the rotation rate sensor.
Figure 8:
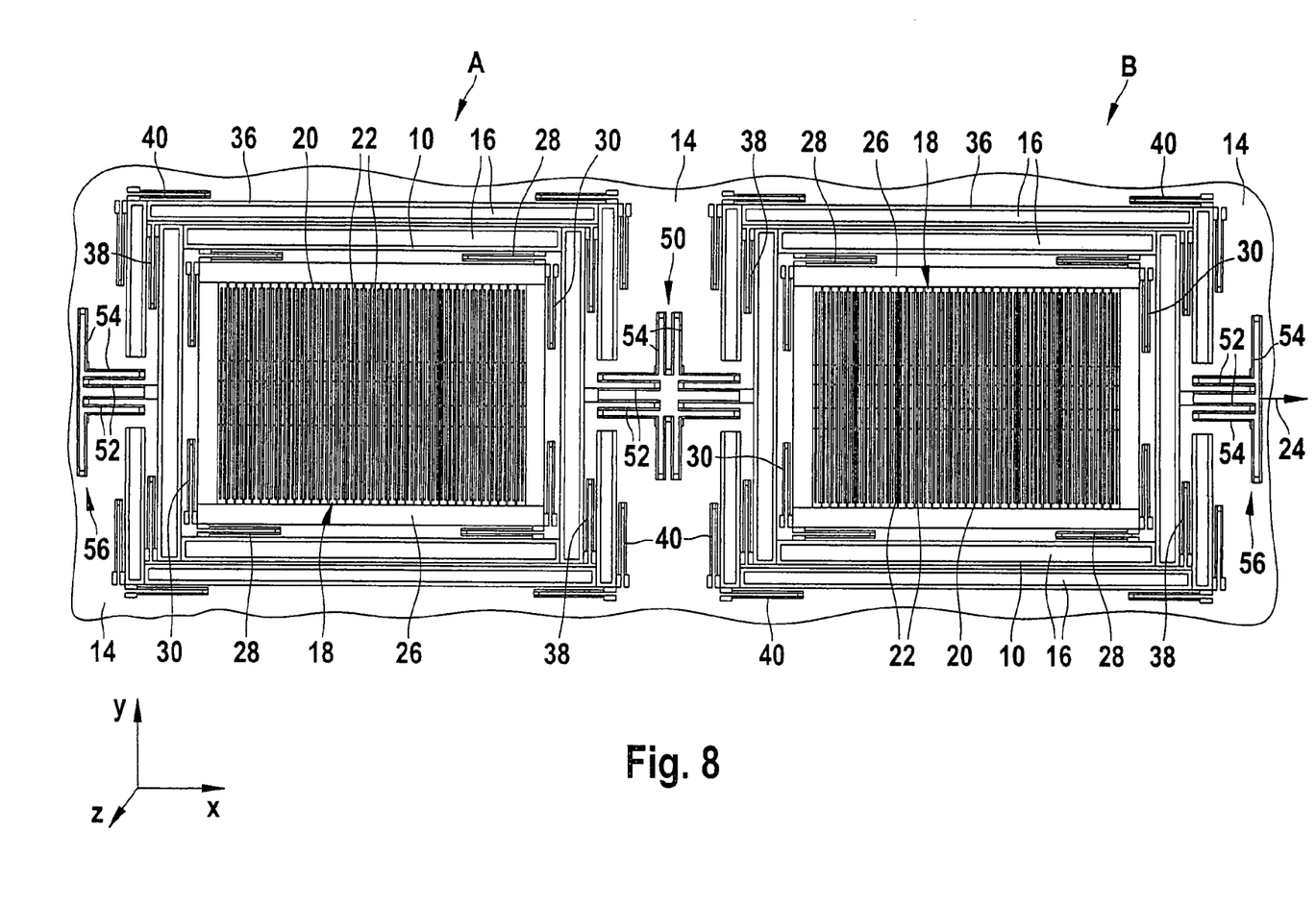
FIG. 8 shows a plan view of a drive frame illustrating an eighth example embodiment of the rotation rate sensor.

FIGS. 7 and 8 show plan views of further drive frames to illustrate a seventh and an eighth development of the rotation rate sensor. The rotation rate sensors schematically illustrated in FIGS. 7 and 8 are further developments of the rotation rate sensor from FIG. 4.

The rotation rate sensor from FIG. 7 may be called a dual-oscillation structure made up of two structures A and B according to FIG. 4. Each of the two structures A and B includes components 10 through 22, 26 through 30, 36 and 38 already elucidated with the aid of FIG. 4. The placement of springs 28, 30, 38 and 40 for both structures A and B corresponds to the specific development from FIG. 4.

Electrode grids 18 of both structures A and B are mutually aligned such that their actuator electrodes 20 extend parallel to each other along the y-axis. Electrode grids 18 are coupled to both structures A and B in such a way that they are adjustable along shared deflection direction 24 relative to stator electrodes 22 by a Coriolis force.

Thus, the rotation rate sensor from FIG. 7 includes two inner drive frames 10 and two outer drive frames 36, each of which is able to be set into an oscillatory motion along the z-axis relative to the mounting device having base plate 14. A first structure A from an inner drive frame 10 and an adjacent outer drive frame 36 is set into a first oscillatory motion such that it oscillates in phase opposition to a second oscillatory motion of second structure B from an inner drive frame 10 and an adjacent outer drive frame 36. The phase difference of the oscillatory motions of the two structures A and B thus amounts to 180°. This could also be called an anti-parallel oscillation of structures A and B.

Via a coupling device 50, through which inner drive frame 10 of first structure A is connected to inner drive frame 10 of second structure B, it is additionally ensured that the opposite-in-phase oscillatory motions of the two structures A and B are reliably maintained. Coupling device 50 may be made up of a plurality of U-springs 52, for instance. U-springs 52 preferably have high flexural rigidity along their longitudinal direction and low flexural rigidity perpendicular to their longitudinal direction. In addition, coupling device 50 may include angular springs 54, which are designed such that their two sides are mutually adjustable from an original position, in which the two sides are situated at a 90° angle relative to each other.

However, it is pointed out here that rotation rate sensors having two structures A and B oscillating in phase opposition are not restricted to coupling device 50 shown in FIGS. 7 and 8. For instance, a suitable coupling device may also be made up of a plurality of angular elements whose sides are situated relative to each other in such a way that no movement is possible. Each angular element may be placed such that it is rotatable about an axis of rotation running perpendicular to the two sides through an intermediate region between the two sides. A coupling device composed of a plurality of such angular elements also ensures that 180 degrees out of phase oscillations of the two structures A and B are reliably maintained.

The two structures A and B oscillating in phase opposition are optimized for detecting a rotary motion of the rotation rate sensor about the y-axis and/or for determining the associated rate of rotation. However, because of the 180 degrees out of phase oscillation of the two structures A and B, a rotation of the rotation rate sensor about the y-axis results in Coriolis forces that shift electrode grids 18 of both structures A and B relative to their stator electrodes 22 in different directions along deflection direction 24. In comparison with the rotation rate sensor from FIG. 4, this has the advantage that an acceleration in the x-direction acting on the rotation rate sensor is clearly differentiable from a rotation of the rotation rate sensor about the y-axis.

If an acceleration in the x-direction is acting on the rotation rate sensor from FIG. 7, then this leads to a deflection of the electrode grids 18 of both structures A and B relative to their stator electrodes 22 in a common direction along deflection direction 24. This differs significantly from the deflection of electrode grids 18 of the two structures A and B in different directions along deflection direction 24 in a rotation of the rotation rate sensor about the y-axis. Since a linear acceleration has an in-phase effect on the displacement movements of structures A and B, it is clearly distinguishable from a rotation of the rotation rate sensor about an axis that has an anti-phase effect on the displacement movements of structures A and B.

The rotation rate sensor includes an evaluation device (not shown), which is designed to determine that, in a displacement of the two electrode grids 18 in the shared direction along deflection direction 24 relative to stator electrodes 22, the displacement movements of electrode grids 18 are not attributable to a rotation of the rotation rate sensor about an axis of rotation. The evaluation device is preferably configured for a mutual comparison of the voltage changes that arise in a displacement of electrode grids 18, and thus for specifying a rate of rotation only on the basis of a voltage change or a partial voltage change, at which it is ensured that the voltage change or the partial voltage change is indeed the result of a rotation of the rotation rate sensor about the y-axis.

For instance, the evaluation device includes a unit for the electric subtraction of the tapped voltage signals of structures A and B. The voltage changes resulting from a linear acceleration compensate each other. On the other hand, the voltage changes of the 180 degrees out of phase accelerations in the case of a Coriolis force add up. With the aid of such a unit for an electrical subtraction, it is possible to suppress the cross influences of a linear acceleration on the rate of rotation in a simple manner. In addition, such a unit for electrical subtraction is able to be realized in relatively cost-effective manner.

Designing the rotation rate sensor as dual-oscillation structure with two structures A and B that oscillate in precise phase opposition therefore makes it possible to largely prevent a signal falsification due to a linear acceleration.

The example embodiment of the rotation rate sensor schematically reproduced in FIG. 8 has the advantage already described earlier.

In supplementation of the example embodiment of FIG. 7, the rotation rate sensor from FIG. 8 has two coupling elements 56, and each one of the two inner drive frames 10 is connected to the mounting device via a coupling element 56. Coupling elements 56 may also be made up of U-springs 52, angular springs 54 and/or (not illustrated) angular elements, as described above. The additional use of coupling elements 56 ensures that the 180 degrees out of phase oscillatory movements of the two structures A and B are maintained reliably.

Figure 9:
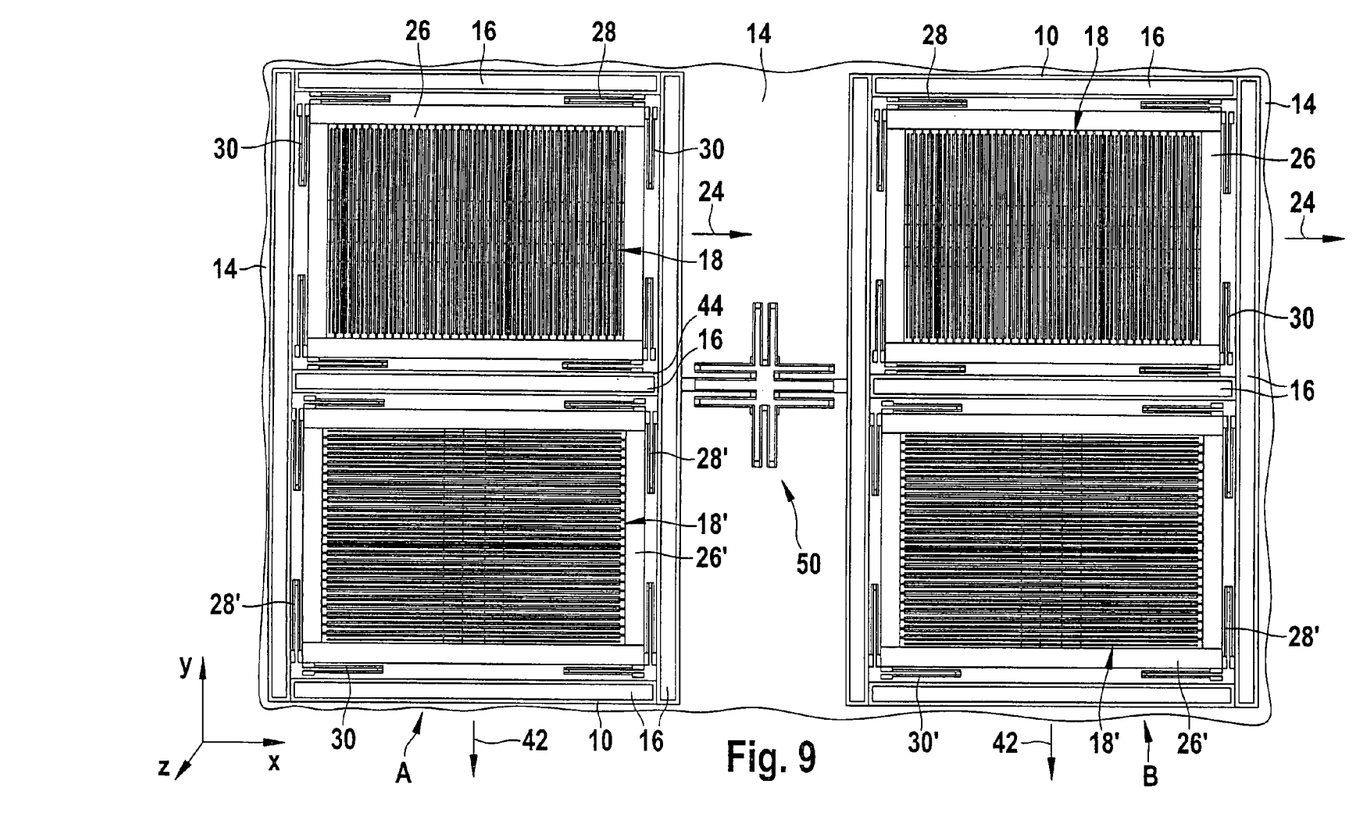
FIG. 9 shows a plan view of a drive frame illustrating a ninth example embodiment of the rotation rate sensor.
Figure 10:
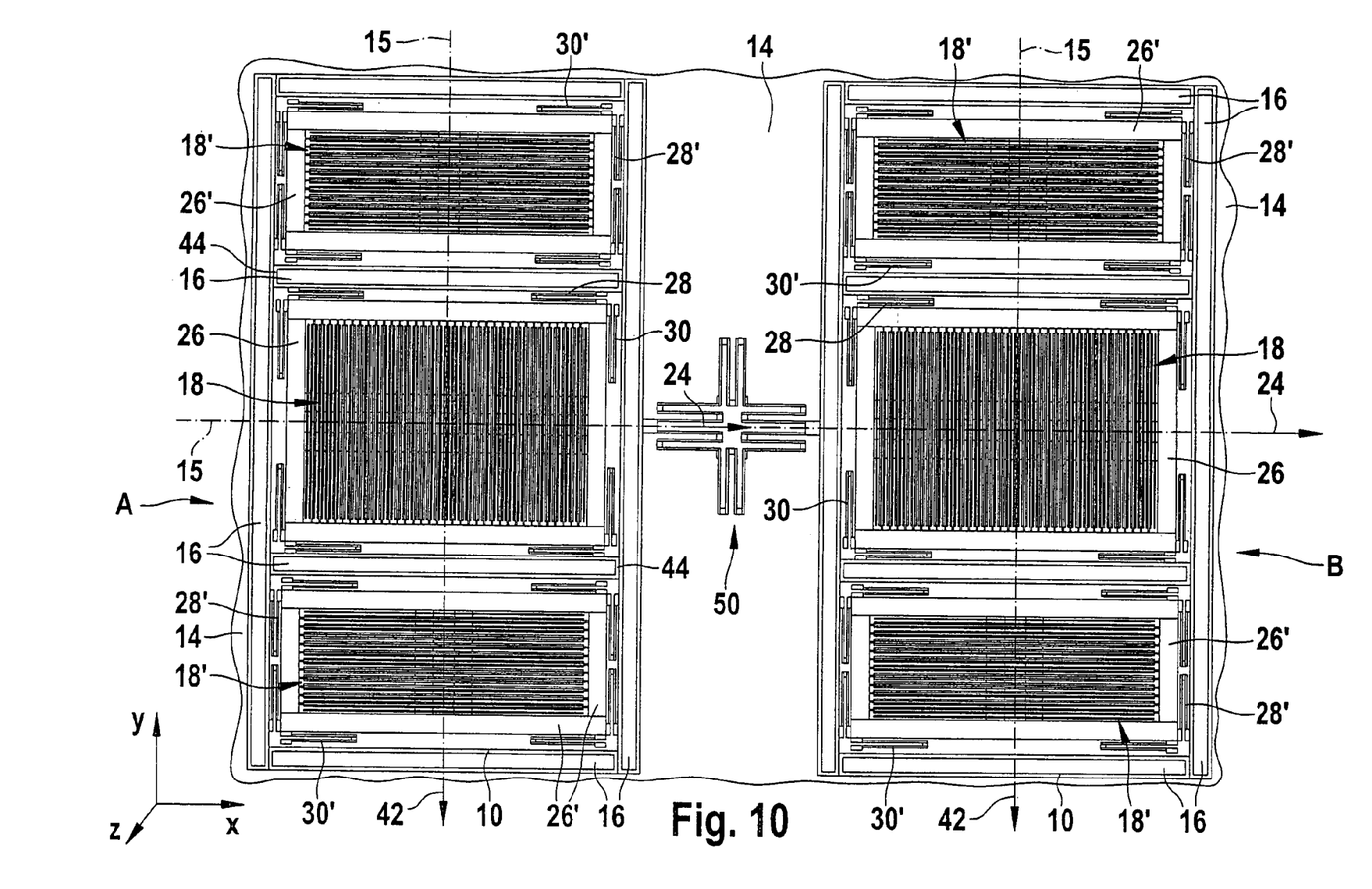
FIG. 10 shows a plan view of a drive frame illustrating a tenth example embodiment of the rotation rate sensor.

FIGS. 9 and 10 show plan views of further drive frames to illustrate a ninth and tenth development of the rotation rate sensor. The rotation rate sensors schematically illustrated in FIGS. 9 and 10 are further developments of the rotation rate sensor from FIGS. 5 and 6.

Each of the two rotation rate sensors includes two structures A and B, which may be induced to execute out-of-plane oscillatory movements that are in phase opposition. Each structure A and B includes at least two electrode grids 18 and 18', which are orthogonally aligned with respect to each other.

The rotation rate sensors from FIGS. 9 and 10 can thus be called dual-channel or dual-axes rotation rate sensors, which are designed as dual oscillators. Because of the 180 degrees out of phase drive and the differential evaluation of the voltage changes, a voltage change caused by a linear acceleration is able to be eliminated in a simple manner. The rotation rate sensors from FIGS. 9 and 10 thus ensure the advantages of the example embodiments from FIGS. 5 through 8. Since the method of functioning and the advantages of the further developments of FIGS. 9 and 10 result from the above explanation for one skilled in the art, they are not addressed here.

In contrast to the example embodiment from FIG. 9, the example embodiment from FIG. 10 has the advantage that the masses are distributed in precise mirror symmetry with respect to two center axes 15 running in the xy-plane. This ensures better maintaining of the oscillatory motions along the z-axis.

What is claimed is:

1. A rotation rate sensor, comprising:
    a mounting device;
    a first drive frame having a drive, wherein the drive is configured to set the first drive frame into a first oscillatory motion along an axis of oscillation relative to the mounting device, the axis of oscillation being in non-parallel alignment with an inner surface framed by the first drive frame;
    at least one first stator electrode;
    at least one first actuator electrode coupled to the first drive frame in such a way that, in a rotary motion of the rotation rate sensor due to a Coriolis force, the at least one first actuator electrode is displaced in a first deflection direction relative to the at least one first stator electrode; and
    an evaluation device configured to (a) determine a value of a voltage applied between the at least one first stator electrode and the at least one first actuator electrode, and (b) specify information regarding the rotary motion of the rotation rate sensor while taking the determined value of the voltage into account.

2. The rotation rate sensor as recited in claim 1, wherein the axis of oscillation is aligned at an angle of inclination of between 85° to 90° relative to the inner surface framed by the first drive frame.

3. The rotation rate sensor as recited in claim 1, wherein the drive includes at least one drive electrode mounted on the first drive frame, at least one counter electrode fixedly situated with respect to the mounting device, and a control device configured to apply a drive voltage between the at least one drive electrode and the at least one counter electrode.

4. The rotation rate sensor as recited in claim 3, wherein at least the first actuator electrode is mounted on a detection frame, and wherein the detection frame is connected to the first drive frame by at least one intermediate spring.

5. The rotation rate sensor as recited in claim 4, wherein the detection frame is connected to the mounting device by at least one internal spring.

6. The rotation rate sensor as recited in claim 4, wherein the first drive frame is framed by an outer drive frame, the outer drive frame being connected to the first drive frame by at least one additional intermediate spring, and wherein the drive is additionally configured to set the outer drive frame into the first oscillatory motion along the axis of oscillation.

7. The rotation rate sensor as recited in claim 3, wherein the rotation rate sensor includes multiple first actuator electrodes at least partially situated parallel to one another along a first longitudinal axis, and wherein the multiple first actuator electrodes form a first electrode grid.

8. The rotation rate sensor as recited in claim 3, further comprising:
    at least one second stator electrode; and
    at least one second actuator electrode coupled to the first drive frame in such a way that, in a further rotary motion of the rotation rate sensor due to an additional Coriolis force, the at least one second actuator electrode is displaced relative to the at least one second stator electrode in a second deflection direction different from the first deflection direction.

9. The rotation rate sensor as recited in claim 8, wherein the rotation rate sensor includes multiple second actuator electrodes at least partially situated parallel to one another along a second longitudinal axis, and wherein the multiple second actuator electrodes form a second electrode grid.

10. The rotation rate sensor as recited in claim 8, further comprising:
   a second drive frame configured to be set into a second oscillatory motion along the axis of oscillation with the aid of the drive, wherein the second oscillatory motion is in 180° phase opposition to the first oscillatory motion;
   at least one third stator electrode; and
   at least one third actuator electrode coupled to the second drive frame in such a way that, in a rotary motion of the rotation rate sensor due to the Coriolis force, the at least one third actuator electrode is displaced in the first deflection direction relative to the at least one third stator electrode.

* * * * *